Nov. 19, 1963   W. J. THOMPSON   3,111,671
AIRCRAFT LANDING SYSTEM
Filed July 11, 1960                    4 Sheets-Sheet 1

INVENTOR.
William J. Thompson
BY Hugh S. Miller Jr.

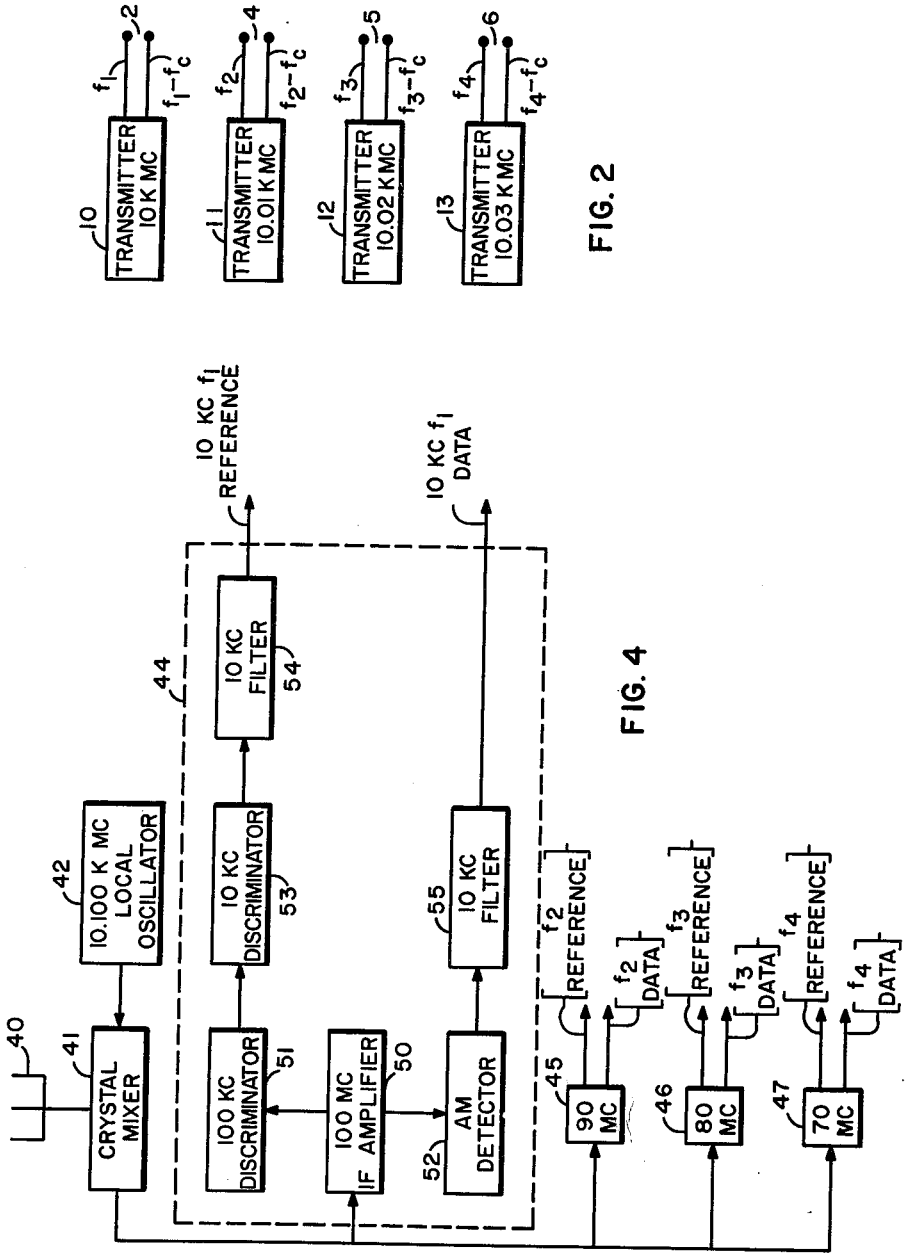

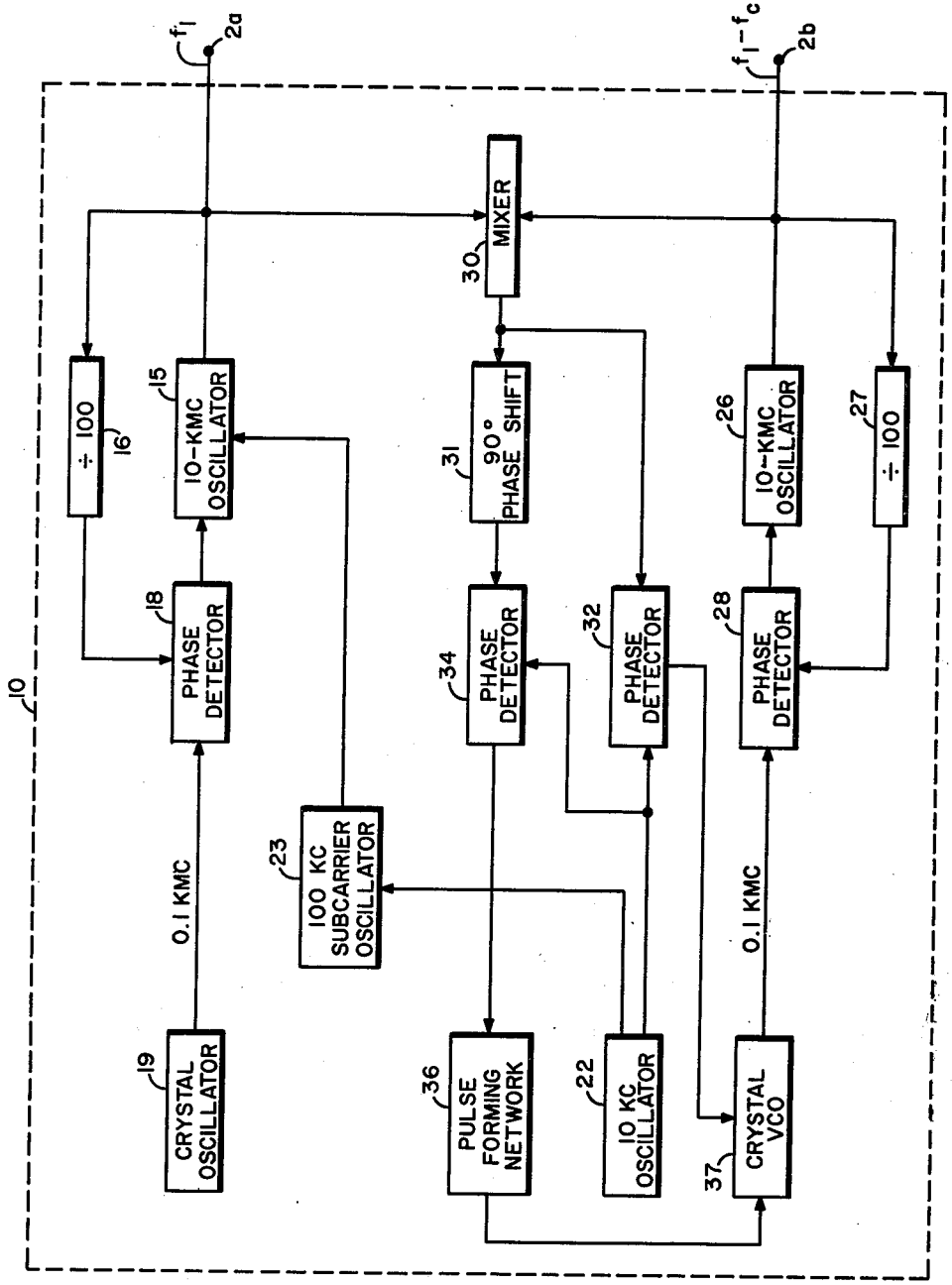

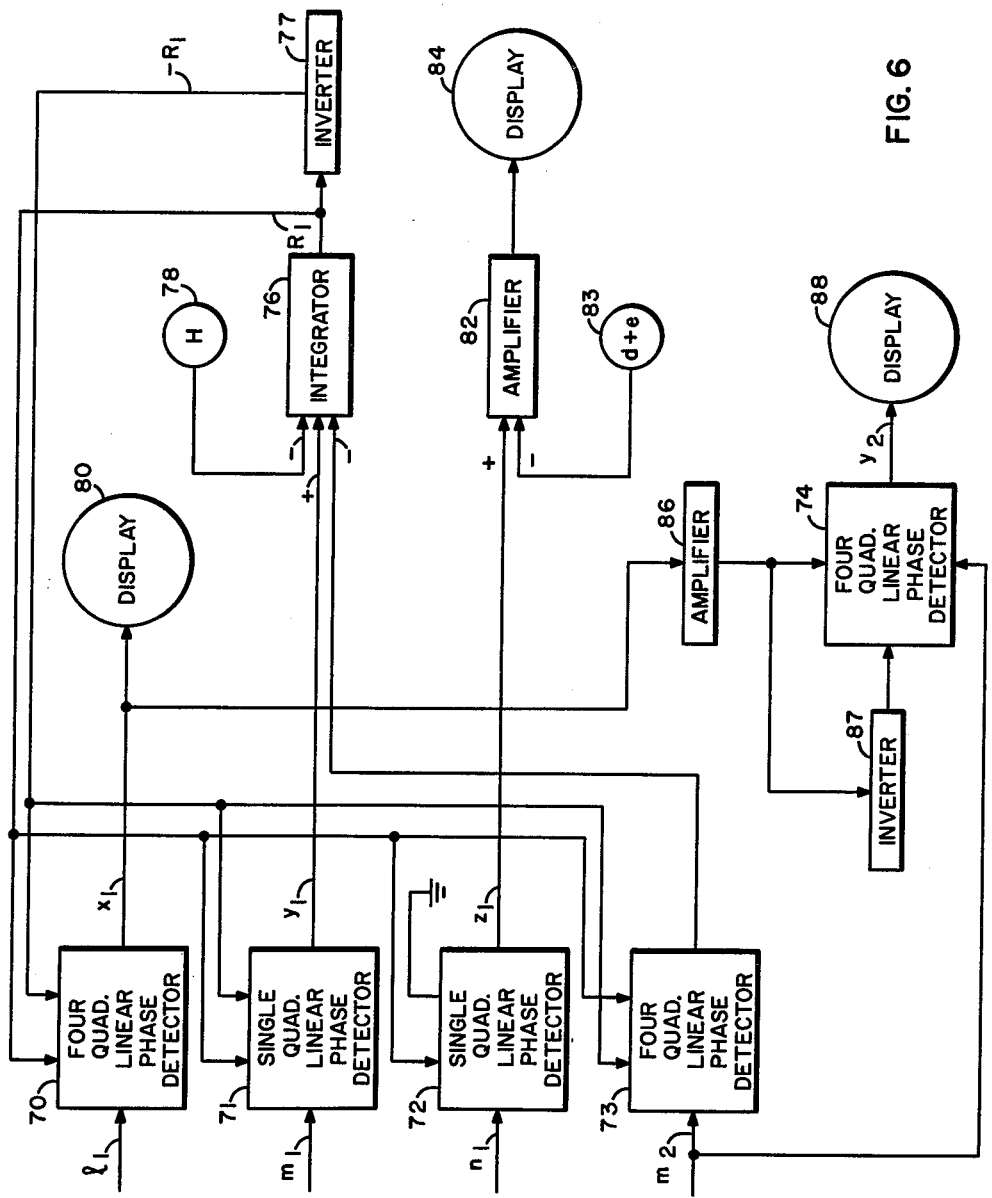

3,111,671
AIRCRAFT LANDING SYSTEM
William J. Thompson, San Diego, Calif., assignor to Cubic Corporation, San Diego, Calif., a corporation of California
Filed July 11, 1960, Ser. No. 41,809
11 Claims. (Cl. 343—112)

The present invention relates to an aircraft landing system and, more particularly, to a non-saturable electronic system capable of producing highly accurate $x$, $y$, and $z$ aircraft position data within each of any number of nearby aircraft for landing and ground control purposes.

A typical aircraft flight is divided into a series of distinct operational modes which serve to define its control-information requirements until termination. These operational modes, after the usual take-off procedures, include enroute operation, terminal penetration, terminal holding or let-down, landing approach control, flare-out, touch-down, and, finally, ground control. The electronic system constituting the basis of the present invention is concerned with providing $x$, $y$ and $z$ information of sufficient accuracy, in the aircraft, for the flare-out, landing, and duration of roll-out during all-weather operation. The information supplied may be coupled into a computer and autopilot for automatic operation, presented to the pilot for manual operation, or integrated into a combination of both to permit pilot override. The particular manner of using or employing the information thus derived is not included as a portion of the present system, although its applicability to standard presentation and computational devices will be readily apparent.

The basic electronic technique employed in furnishing position information to each approaching aircraft is termed "inverted AME," or "inverted Angle-Measuring Equipment." Non-inverted or straight AME techniques have been described in some detail in U.S. Patent No. 2,976,530 entitled "A Multiple-Target Tracking System," by Robert V. Werner, Walter J. Zable, William J. Thompson, and Arthur E. Noyes, filed August 8, 1959, and a co-pending application for patent entitled "Electronic Acquisition Devices for Narrow-Beamwidth Tracking Systems," by Walter J. Zable, Robert V. Werner, and William J. Thompson, Serial No. 804,757, filed April 7, 1959. Basically considering the operation of the most elementary AME embodiment, the output C.W. signal of a known frequency from a signal source is received on each of a pair of antennas spaced a predetermined fraction of the received signal wavelength apart. Two signals, differing from each other by some predetermined constant amount, say 1-kc., are then mixed with the signals received at the two respective antennas, and the resulting pair of difference signals are then linearly mixed and applied to an I.-F. strip where an amplitude-modulated data signal of 1-kc. results. As pointed out in detail in the patent and the co-pending application or patent referred to above, the phase difference between the detected 1-kc. data signal and the original 1-kc. signal employed to provide the frequency and phase separation between the two ground-based signals applied to the two respective antennas for signal mixing purposes, represents the direction cosine of the transmitting source from the center point of the antenna baseline.

By employing various geometries, for example, two perpendicularly bisecting antenna baselines, a single direction vector pointing to the signal source may be determined from the two direction cosines thus determined. If two, separated cross-baseline antenna systems are employed, then the resulting pair of direction vectors to the signal source are sufficient to locate the signal source in spatial coordinate form.

As just noted, the present system employs an "inverted" AME technique in which the functions described above between the antennas and signal source are reversed. In particular, considering a single antenna pair, one C.W. signal is transmitted from one antenna and a second C.W. signal, differing from the first carrier signal frequency by a constant amount, (10-kc. in the present system) is transmitted from the second antenna. Also, the reference 10-kc. signal, representing the frequency and phase difference between the two antenna transmitted signals, is modulated on another signal, and the resultant signal is then transmitted as a subcarrier on one of the C.W. signals. Then, the two carrier signals are received by an approaching aircraft where a data 10-kc. signal is derived by mixing the two ground-transmitted C.W. signals, and the original 10-kc. reference signal is derived by demodulating the subcarrier signal. The direction cosine of the aircraft relative to the radiating antenna baseline may be determined by measuring the phase difference between the derived 10-kc. reference and data signals.

The ground-based portion of the present landing system employs four separate antenna pairs of arrays positioned along four respective antenna baselines. In particular, one antenna array is flush mounted in the center of the runway and directed perpendicularly to it. A pair of carrier signals, as described above, are transmitted from the respective antennas in this pair along with a subcarrier reference signal. The remaining three antenna pairs are positioned at a point laterally offset several hundred feet from the runway flush mounted antenna array and include a vertical antenna array, a first horizontal antenna array directed parallel to the airport runway, and a second horizontal antenna array directed perpendicularly to the runway. Separate C.W. signal frequencies, along with associated subcarrier reference signals, are transmitted from each of these three offset antenna arrays.

The electronic portion of the landing system, as placed in each approaching aircraft, receives the signals transmitted by the four ground-based antenna arrays and, by frequency separation and discriminator techniques, derives reference and data 10-kc. signals from each of the received antenna array signals. The four sets of signals, in turn representing four direction cosines, are then applied to an airborne computer which, first of all, computes the slant range of the aircraft to the offset antenna point. Then, other computations are performed, employing the direction cosines and the computed slant range, to determine the height, $z$, of the aircraft above the airfield, its left or right distance, $y$, from the runway centerline, and finally, the distance, $x$, of the aircraft along the runway from the flush-mounted antenna array. Each of the $x$, $y$ and $z$ values thus computed may be applied to respective voltmeters, each appropriate scaled in desired units, for presentation to the pilot. Quite obviously, the analog signals representing these dimensions may be readily applied to an autopilot or other computational devices for computing other parameters of interest as may be required for all-weather landing operations.

It is, accordingly, seen that the information furnished within the aircraft is sufficient for all-weather landings. Not only is sufficient information supplied, but the features inherent in the manner of operation of the present system provide it with a number of distinct advantages over other types of aircraft landing systems which have been and are being proposed. First, any number of on-the-ground or in-flight aircraft within range of the ground transmitters may simultaneously derive their individual position information. Accordingly, the technique is inherently immune to saturation. Then too, since each aircraft derives all required position information "passively," the technique requires no double communication loops of the type inherent in a number of other landing systems both constructed and proposed. That is, the ground station need not transmit signals to an approaching aircraft, receive a return signal from the aircraft, compute the aircraft position, and then retransmit either position or control information back to the aircraft. Also, the airborne equipment required is only slightly more complicated than a standard communications receiver, and possesses no size or cost characteristics precluding its use in normal aircraft. Further, the fact that position is being derived within the aircraft itself appears psychologically advantageous to the pilot. He will be able to decide, from a number of observed factors, whether the receiver is working satisfactorily and hence, whether the position data can be employed with confidence for the landing operation. This judgment is not possible when ground produced information is merely transmitted for display.

Accordingly, the principal object of the present invention is to provide an all-weather aircraft landing system in which a series of C.W. signals are radiated from a ground-based antenna system, received by an approaching aircraft, converted into a series of direction cosines, and the aircraft's spatial coordinate position computed and displayed.

Another object of the present invention is to provide an aircraft landing system wherein an aircraft may passively derive its $x$, $y$, and $z$ position relative to a known point to high accuracy by determining a series of direction cosines to a series of ground-based C.W. radiating antennas positioned around the point, and performing computations on the series of direction cosines thus obtained.

Still another object of the present invention is to provide an aircraft landing system wherein a series of ground-transmitted C.W. signals are passively received by an aircraft and its spatial coordinate location relative to a known ground point determined by phase-comparison and analog computational techniques.

A further object of the present invention is to provide an aircraft landing system including a ground station transmitting a series of C.W. signals received by an approaching aircraft which, in response thereto, determines a series of direction cosines to the ground station and employs the series of direction cosine values to compute its spatial coordinate position relative to the ground station.

A still further object of the present invention is to provide an aircraft landing system employing inverted AME techniques where radiating signals are transmitted from a ground-based antenna system and received by nearby aircraft which, in turn, determine various direction cosines to the antenna system and from the direction cosines compute their respective spatial coordinate locations relative to the antenna system.

Another object of the present invention is to provide an aircraft landing system which includes one antenna array on the aircraft runway and three adjacent antenna arrays offset from the landing system, all of which transmit frequency-separated C.W. signals which, in turn, are received by an approaching aircraft, the aircraft including an electronic section which determines four direction cosines to the four antenna arrays and a computer which employs the four direction cosines to compute $x$, $y$ and $z$ spatial coordinate information of the aircraft position relative to the antenna array located on the runway.

Other objects, features and attendant advantages of the present invention will become more apparent to those skilled in the art as the following disclosure is set forth including a detailed description of a preferred embodiment of the invention as illustrated in the accompanying sheets of drawings, in which:

FIGURE 2 illustrates, in block schematic form, the transmitters associated with the antenna arrays shown earlier in FIGURE 1;

FIGURE 3 is a detailed block diagrammatic presentation of a typical transmitter shown earlier in FIGURE 2;

FIGURE 4 is a block diagrammatic representation of the receiver unit of the airborne electronic portion of the present landing system;

FIGURE 6 is a block diagrammatic representation of the computer unit in the airborne portion.

Figure 1:
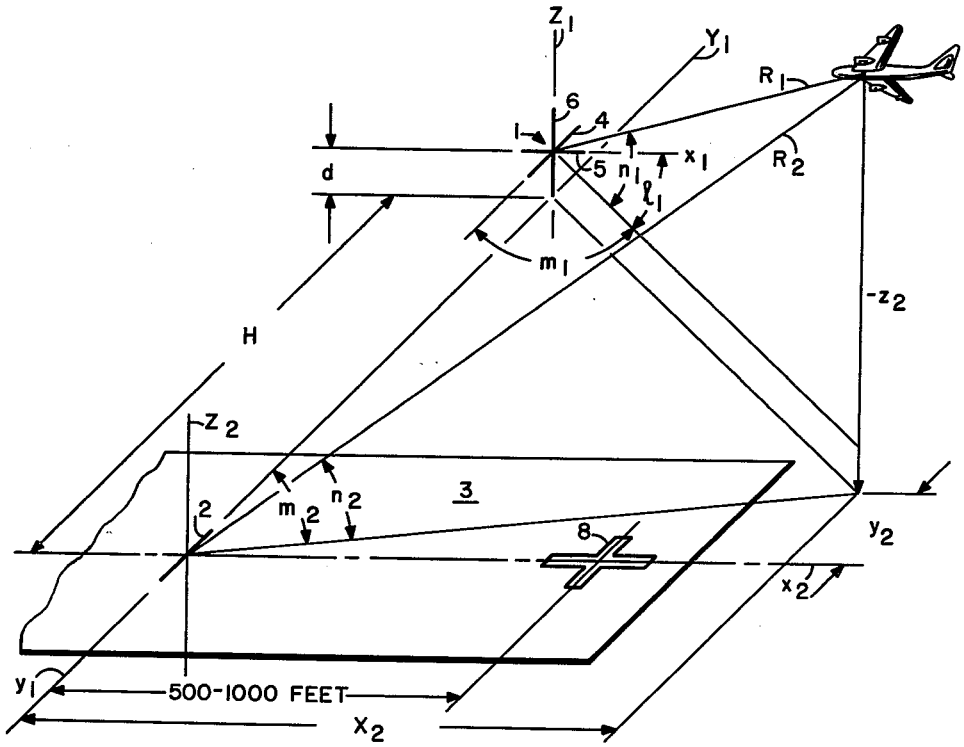
FIGURE 1 is a schematic representation of one end of a typical airport runway and associated antenna system, and particularly illustrates the geometry employed in the aircraft landing system.

Referring now to the drawings, wherein the same elements are given identical numerical designations throughout the several figures, the fundamental geometrical configuration of the ground-based portion of the landing system according to the present invention is illustrated in FIGURE 1. The particular portion shown represents one antenna system and its associated touchdown point for aircraft landing in a right to left direction. A similar antenna system, not shown, is symmetrically located at the opposite end of the runway, and provides corresponding information to aircraft landing from left to right.

In particular, the end of the runway is illustrated at 3, the surrounding ground and terrain not herein being specifically illustrated. The centerline of the runway is indicated by an $X_2$ axis. A horizontal antenna array 2 comprising a pair of flush-mounted antennas separated by three wave-lengths of its transmitted signal frequency, as described later, is directed perpendicularly to the runway centerline at a point 500 to 1000 feet from the desired touchdown point 8, shown at the large X. An offset antenna system 1 is located at a distance H from the runway centerline along the horizontal-pair baseline. This antenna system, shown in a schematic form, includes a vertical antenna array 6, comprising a pair of antennas separated by $1\tfrac{1}{2}\lambda$ or wavelengths, based on its transmitted signal, and a first horizontal antenna array 4, comprising a pair of antennas lying parallel to antenna array 2 and positioned along the center of vertical array 6. Also, a second horizontal offset antenna array, indicated at 5, positioned at the center of vertical array 6, is directed parallel to the runway centerline and hence perpendicularly to horizontal antenna pair 4. Both of these offset horizontal antenna arrays include a pair of antennas which are positioned $\tfrac{1}{2}\lambda$ wavelength apart, as based on their respective transmitted signal wavelengths.

In operation, each of the four antenna arrays transmits uniquely identifiable signals of different frequencies, to an antenna mounted beneath the approaching aircraft. As described in detail later, a direction-cosine value $m_2$, corresponding to the angle between the aircraft position and the runway centerline, is determined in the aircraft from the received horizontal-array 2 transmitted signals. A direction cosine value $n_1$, corresponding to the elevation angle between the aircraft and the offset antenna system is determined from the vertical array 6 signals. The corresponding direction cosines $m_1$ and $l_1$ are determined from the offset first and second horizontal-array 4 and 5 signals, respectively. The required $x$, $y$, and $z$ coordinates of the aircraft are determined from these measured values in accordance with the equations derived below.

The $x$—$y$—$z$ coordinates of aircraft position, based on the coordinate system of antenna system 1, where the $y_1$ axis is perpendicular to the runway, the $x_1$ axis extends parallel to the runway, and the $z_1$ axis extends upward, are:

$$z_1 = R_1 n_1 \quad (1)$$
$$y_1 = R_1 m_1 \quad (2)$$
$$x_1 = R_1 l_1 \quad (3)$$

where $R_1$ is the slant range from the aircraft to the coordinate origin.

Correspondingly, for the antenna array 2 coordinate system, $$y_2 = R_2 m_2 \quad (4)$$
$$z_2 = R_2 n_2 \quad (5)$$

The relationship between the array 1 and array 2 coordinate systems may be expressed as follows:

$$x_1 = x_2 \quad (6)$$
$$y_1 = y_2 + H \quad (7)$$
$$z_1 = z_2 + d \quad (8)$$

where $d$ is the height of the pair of horizontal antenna arrays of antenna system 1 above antenna array 2.

Solving for $R_1$, yields:

$$R_1 = \frac{Hn_2 - dm_2}{m_1 n_2 - n_1 m_2} \quad (9)$$

$$= \frac{H - (dm_2/n_2)}{m_1 - (m_2 n_1/n_2)} \quad (10)$$

In Expression 10 $dm_2/n_2$ is negligible compared to H and $n_1/n_2 \approx 1$; therefore $$R_1 \approx \frac{H}{m_1 - m_2} \quad (11)$$

In the same way, if $z_2$ represents the height of the aircraft antenna above the runway, and if $c$ is the distance between the antenna and the bottom of the aircraft wheels, then the vertical distance to touchdown may be solved to yield:

$$z_2' = R_1 n_1 - d - c \quad (12)$$

Finally $y_2$ can be derived from Equation 4 except that $x$ is employed instead of $R_2$:

$$y_2 = x m_2 \quad (13)$$

It will be noted that the substitution of $x$ for $R_2$ in Equation 4 to form Equation 13 is permissible since $x$ and $R_2$ are nearly identical for small values of $m_2$.

In the aircraft, $R_1$ may be initially determined from $H_1$, $m_1$ and $m_2$. The computed value of $R_1$ is then used to determine $z_2'$ from Equation 12, $x$ from Equation 3 and $y_2$ from Equation 13. In this way, then $x$, $y$ and $z$ may be computed within the aircraft during approach and landing. The detailed manner of accomplishing this computation will be set forth in detail, in conjunction with FIGURE 6, later during the description of the airborne portion of the present landing system.

The ground-based electronic portion of the system according to the present invention is set forth in block schematic form in FIGURE 2. In particular, four separate transmitters are illustrated at 10, 11, 12 and 13. Transmitter 10 produces a pair of frequency related signals, $f_1$ and $f_1 - f_c$, which, in turn, are applied to the two antennas constituting antenna array 2, as indicated. In the same way, transmitter 11 produces a pair of frequency related signals, $f_2$ and $f_2 - f_c$, as separately applied to the two respective antennas constituting the first horizontal antenna array 4. In a similar fashion, transmitter 12 produces signals $f_3$ and $f_3 - f_c$, which are applied to the two antennas constituting the other offset horizontal antenna array 5, while the final transmitter 13 produces output signals of $f_4$ and $f_4 - f_c$, which are applied to the pair of antennas constituting the vertical antenna array 6.

All of the transmitters illustrated in FIGURE 2 are substantially identical and differ only in respect to the particular signal frequencies generated and applied to their respective antennas. A block diagrammatic representation of transmitter 10 is next illustrated in FIGURE 3, and is shown as a representative ground-based transmitter. In the figure, the output terminal of a 10-kmc. oscillator 15 is connected to an antenna 2a, representing one of the antennas within antenna array 2, and also to the input terminal of a frequency divider 16, furnishing a frequency division of 100.

The output signal of divider 16 is applied to one input terminal of a phase detector 18, the output signal from detector 18 being applied to a control input terminal of the 10-kmc. oscillator 15. The output .1-kmc. signal frequency of a crystal-controlled oscillator 19 is applied to the other input terminal of phase detector 18.

The output terminal of another 10-kmc. oscillator 26 is connected to the other antenna 2b of antenna array 2, and also to the input terminal of another frequency divider 27, providing a frequency division of 100. The output signal of divider 27 is applied to one input terminal of a phase detector 28, the output signal of detector 28 being applied to the control input terminal of oscillator 26.

The output signal of a 10-kc. oscillator 22 is applied as a control signal to a 100-kc. subcarrier oscillator 23, whose output signal, in turn, is applied to a modulator input terminal of oscillator 15. The output signals of both of 10-kmc. oscillators 15 and 26 are applied to the two respective input terminals of a mixer 30, whose output signal, in turn, is applied to one input terminal of a phase detector 32 and, additionally, is passed through a 90° phase shift network 31 to one input terminal of another phase detector 34. The output signal of 10-kc. oscillator 22 is applied to the other input terminals of each of phase detectors 32 and 34, while the output signal from detector 34 is passed through a pulse forming network 36 to one control input terminal of a crystal voltage-controlled oscillator 37. Also, the output signal of phase detector 32 is applied to a crystal voltage-controlled oscillator 37, and the output signal, 0.1-kmc. in frequency, of this oscillator is applied to the remaining input terminal of phase detector 28, to thereby close the loop on the final frequency control of oscillator 26.

In describing the operation of this typical ground-based transmitter 10, consider first the operation of that portion of the circuitry producing the output signal $f_1$. Assume initially that the 10-kmc. oscillator 15 is producing an output signal of exactly 10-kmc. This signal frequency is divided 100 times by divider 16 to .1-kmc., which is then compared with the .1-kmc. output signal frequency of the highly stable crystal oscillator 19 in phase detector 18. Under the stated conditions, no error signal will be produced by phase detector 18. However, upon any deviation of the oscillator 15 output signal away from the assumed 10-kmc. output frequency, phase detector 18 will produce an output D.-C. voltage whose magnitude and polarity represent the amount and direction, respectively, of the frequency offset away from the predetermined 10-kmc. value. This D.-C. error signal, in turn, acts to servo or control the output signal of oscillator 15 until the $f_1$ or null signal frequency is again produced.

The remaining portion of the circuitry serves to control the output signal frequency of the other 10-kmc. oscillator to exactly $f_c$, or 10-kc. less than the $f_1$ frequency, and additionally modulates the reference 10-kc. signal on a subcarrier on the $f_1$ output signal. The frequency servoing function is produced by applying the respective output signals of oscillators 15 and 26 to mixer 30 and applying the resulting difference signal from mixer 30 to phase detector 32. The value of this detector 32 output signal corresponds to the difference in phase between the oscillator 22 signal and the frequency difference between the signals of oscillators 15 and 26. When no phase difference occurs, no control signal is applied by detector 32 to crystal voltage-controlled oscillator 37. On the other hand, any deviations of the oscillator 26 frequency away from the specified 10-kmc. offset from the master oscillator 15 frequency will be accordingly corrected by modifying the oscillator 37 frequency, as described.

The signal from 10-kc. oscillator 22 employed, as just described, to maintain the 10-kc. difference between the pair of output carrier signals, is also employed to frequency modulate the output signal of a 100-kc. subcarrier oscillator 23, and the resulting signal, in turn, is frequency modulated on the output signal of oscillator 15 as a subcarrier. In this way, the exact frequency difference between the carrier signals is transmitted as a reference signal to the receiving aircraft, as required for the inverted AME technique, as described.

In the circuitry described thus far, it will be appreciated that the signal produced by oscillator 26 can either be 10-kc. above or below the output signal of oscillator 15, since there is no way to determine which direction the difference lies through the mixer 30 and detector 32 arrangement, as shown. However, for purposes of maintaining proper system operation, it is necessary to hold the oscillator 26 signal 10-kc. less than, rather than above, $f_1$. Accordingly, the output signal from mixer 30 is applied through a 90° phase shifter 31 and compared by phase detector 34 with the 10-kc. signal from oscillator 22. Assume that the parameters of this phase shifter and phase detector are so related that a negative output signal is produced by detector 34 whenever the desired $f_1-f_c$ signal is produced by oscillator 26 and, on the other hand, that a positive output signal is produced by phase detector 34 when oscillator 26 produces an $f_1+f_c$ frequency.

Pulse forming network 36 may, for example, comprise a Schmitt trigger which triggers "on" in response to a positive input signal. This positive signal may then be differentiated by a differentiating circuit, also assumed in the pulse forming network, with the result that a positive-going pulse is produced from the operation of the Schmitt trigger. This positive pulse, preferably smeared to form a ramp type of waveshape, may, for example, be applied to a voltage-sensitive diode in the voltage-controlled oscillator circuit which, in turn, causes the oscillation frequency to suddenly decrease as the pulse is initially applied, and then gradually rise with the ramp voltage waveshape. If the initial frequency decrease carries the output frequency of oscillator 37 below the $f_1-f_c$ value, as is assumed, then, when the $f_1-f_c$ frequency is reached upon the subsequent frequency rise of the oscillator, the oscillator frequency will lock on to this desired difference frequency. Thereafter, pulse forming network 36 will receive a negative input signal from detector 34 with no additional triggerings taking place.

FIGURE 4 shows the receiver portion of the circuitry required on the landing aircraft. In particular, the ground-transmitted series of signals are received on an aircraft antenna 40 and coupled into a crystal mixer 41. The 10.100-kmc. output signal of a local oscillator 42 is also applied to crystal mixer 41, while the mixer 41 output signal is applied to the input terminals of each of discriminator systems 44, 45, 46 and 47, all similar, with the exception of their particular I.-F. amplifier frequencies.

Considering discriminator system 44 as representative of the other, similar systems, there is included an I.-F. amplifier 50 tuned to 100-mc., whose input terminal is coupled to the output terminal of mixer 41. The output signal of amplifier 50 is, in turn, applied to the input terminals of both a 100-kc. discriminator 51 and an A.-M. detector 52. The output signal of discriminator 51 is applied serially through a 10-kc. discriminator 53 and a 10-kc. filter 54 to furnish a 10-kc. reference $f_1$ output signal. Finally, the output signal of A.-M. detector 52 is passed through a 10-kc. filter 55 to appear as the 10-kc. $f_1$ data output signal.

In operation, antenna 40 receives the series of signals transmitted from the various ground-based antennas, as indicated earlier in FIGURE 2. The output signal of mixer 41 will include four output signals representing the frequency difference between the 10.100-kmc. signal of local oscillator 42 and each of the four ground transmitted signals. In particular, the frequency difference between the $f_1$ 10-kmc. frequency and the 10.100-kmc. signal is 100-mc., which, in turn, is selectively amplified by I.-F. amplifier 50, the other signal frequencies appearing on the mixer 41 output terminal being rejected by this I.-F. amplifier. The output signal of I.-F. amplifier 50 also includes the $f_1-f_c$ signal. Accordingly, as has been described earlier in the above referenced U.S. Patent No. 2,976,530, the $f_c$ or 10-kc. frequency difference between $f_1$ and $f_1-f_c$ will appear as an A.-M. component on the I.-F. signal. Further, the phase relationship between the I.-F. amplitude modulation signal and the original or reference 10-kc. signal produced by oscillator 22 in FIGURE 3 represents the direction cosine information from this received antenna signal. Accordingly, A.-M. detector 52 and the 10-kc. filter 55 serve to detect this A.-M. modulation component and present it as a 10-kc. data signal, which, as later described, is passed into the computer portion of the airborne circuitry for the computational process.

As described earlier, the basic 10-kc. reference signal from oscillator 22 in FIGURE 3 is modulated on the 100-kc. signal which is then modulated on the carrier signal as a subcarrier. The 100-kc. discriminator 51 detects the 100-kc. subcarrier signal, and 10-kc. discriminator 52, with filter 54, detects and filters the basic 10-kc. reference signal and presents it as an output signal, also for later computation.

Discriminator system 45 is similar to system 44 except that its included I.-F. amplifier is tuned to 90 mc. and hence will respond to the transmitter 11 output signals $f_2$ and $f_2-f_c$ from FIGURE 2, with its associated output terminals carrying 10-kc. data and reference signals representing the $l_1$ direction cosine. In the same way, discriminator systems 46 and 47 include I.-F. amplifiers tuned to 80-mc. and 70-mc., respectively, and hence produce on their included output terminals data and reference signals corresponding to the $m_1$ and $n_1$ direction cosines, respectively.

The remaining portion of the airborne equipment, comprising the computer and display of the aircraft's $x$, $y$ and $z$ coordinate position is shown later in FIGURE 6. Two of the primary circuits employed in the FIGURE 6 computer are first illustrated in FIGURES 5a and 5b and comprise single and four-quadrant linear phase detectors, respectively, both employed as analog multipliers in the computer. In particular, considering FIGURE 5a, data and reference signals are applied to a pair of phase input terminals of the multiplier, and, in particular, are passed through a pair of zero crossover detectors 60 and 61, respectively, whose output signals, in turn, are applied to the two respective input terminals, designated S and Z to represent set and zero, of a flip-flop 63. The pair of complementary output signals of flip-flop 63 are applied to an electronic switch 64, which also receives, as indicated, $V_1$ and ground signals on another pair of voltage input terminals. Finally, the output signal of electronic switch 64 is passed through a filter 66 to represent the output signal of the multiplier circuit.

Figure 5:
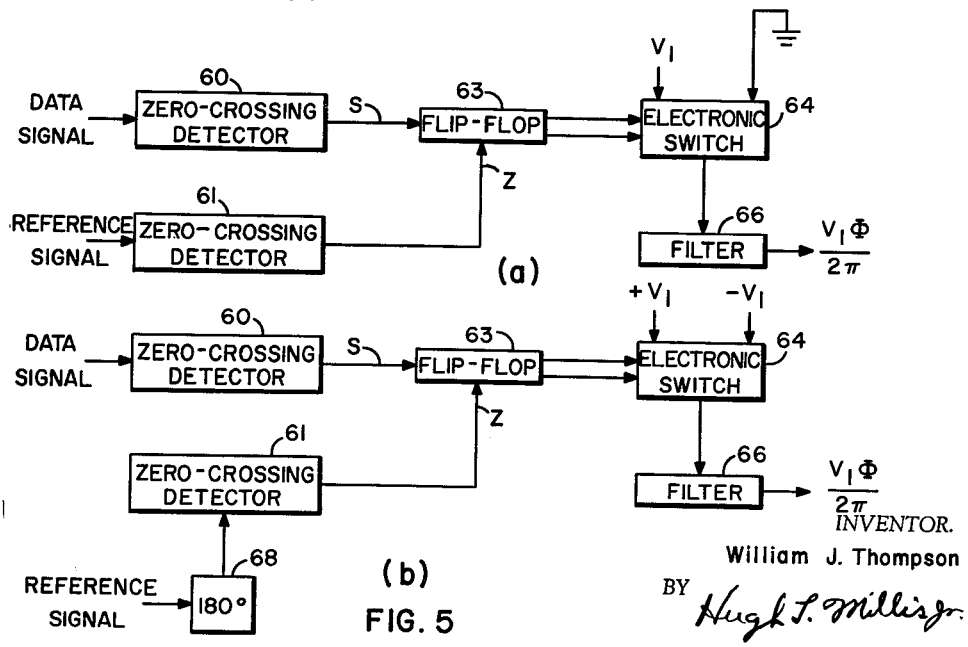
FIGURES 5a and 5b are block diagrammatic representations of a pair of typical analog multiplier units employed in the airborne computer portion.

The four-quadrant multiplier of FIGURE 5b is structurally similar to the one illustrated and described in FIGURE 5a, except that the reference signal is passed through a 180° phase-shifting network 68, and the second voltage input terminal to switch 64 is connected to the $-V_1$ signal, rather than ground, as before described.

In considering the operation of the single-quadrant multiplier of FIGURE 5a first, each of the zero crossover detectors 60 and 61 produces a negative-going output signal each time the applied respective data and reference signals pass zero in the negative direction, that is, going from a positive to a negative value. Flip-flop 63 is assumed to trigger in response to these negative pulses, with the result that its set output signal will be at a relatively high voltage level, for example, corresponding to the phase difference between the reference and data signals. This high voltage level, in relation to a low voltage level, in turn corresponds to the magnitude of the direction cosine, represented by the phase difference between the data and reference signals. In other words, if, for example, the reference signal lags the data signal by 30°, the output signal of flip-flop 63 will be at its high voltage level for 30° during each complete cycle, and this value, averaged over the entire cycle, represents the value of the direction cosine.

Electronic switch 64 essentially operates as a pair of "and" gate circuits, one for the set output terminal of flip-flop 63 and the $V_1$ input signal and the other for the zero output flip-flop terminal signal and the input ground connection. The $V_1$ signal associated "and" gate may comprise, for example, a transistor in series between $V_1$ and ground, with its base being connected to the set output terminal of flip-flop 63. Each time flip-flop 63 is "on," the $V_1$ voltage appears as the output from the switch. On the other hand, each time flip-flop 63 is "off," the other or ground signal appears on the output signal of switch 64.

The output signals of the two "and" gates within switch 64 are connected in common to filter 66 which, in turn, acts to average or smooth out the alternate high and low voltage levels appearing from switch 64. Accordingly, an output D.-C. voltage is produced whose magnitude is the product of the direction cosine represented by the phase difference between the data and reference signals, multiplied by the magnitude of the $V_1$ signal.

The multiplier of FIGURE 5b operates quite similarly to the FIGURE 5a circuitry except that the output signal representing the multiplication can take (+) or (—) values, as may be required when the direction cosine varies between (+) and (—) polarity values. Assume, for the purposes of example, that the data and reference signals are exactly in phase, indicating a zero value for the direction cosine. The 180° phase shift afforded the reference signal by phase shifter 68 will, accordingly, trigger flip-flop 63 off exactly 180° after the data signal has triggered it on, with the result that a symmetrical square wave output will be applied by flip-flop 63 to switch 64. With this operation, the $+V_1$ and $-V_1$ signals will be applied alternately, for equal time durations, by switch 64 to filter 66 and the average value thus obtained at the filter output will accordingly be of zero magnitude, hence representing the original direction cosine value. Continuing, if the direction cosine should, for example, be slightly negative in value, with the reference signal zero crossover point coming slightly ahead of the data signal phase, flip-flop 63 will be "off" for a correspondingly greater length of time than it is "on," with the result that the $-V_1$ signal will be applied to filter 66 for a slightly longer time duration than will the $+V_1$ signal. In this case, the output from the filter will be negative in value to correspond to the polarity of the direction cosine, and its magnitude, as previously explained, again corresponds to the product of the $V_1$ signal magnitude and the direction cosine value.

In FIGURE 6 is shown, as mentioned earlier, the computer portion of the airborne system. The computer receives the various direction cosine values from the receiver unit, previously shown in FIGURE 4, and produces an output display of the aircraft's $x$, $y$ and $z$ position. Specifically, the data and reference signals representing $l_1$ from discriminator system 45 of FIGURE 4 are applied to the phase input terminals of a four-quadrant linear phase detector 70 similar in detail to the one shown in FIGURE 5b. In the same way, the data and reference signals from discriminator systems 46 and 47 of FIGURE 4, and representing $m_1$ and $n_1$, are respectively applied to the phase input terminals of single-quadrant phase detectors 71 and 72, respectively. Finally, the data and reference signals representing direction cosine $m_2$, from discriminator system 44 of FIGURE 4, are supplied to the phase input terminals of each of four-quadrant linear phase detectors 73 and 74.

A D.-C. voltage, corresponding to H, the lateral distance of the offset antenna system 1 from the centerline of the runway, from FIGURE 1, produced, for example, by a potentiometer and voltage source 78, not specifically illustrated, and manually adjustable by the pilot, is applied to one input terminal of an analog integrator circuit 76. The output signals of phase detectors 71 and 73 are applied to two additional input terminals of integrator 76, while the output signal of this integrator, representing $R_1$, is applied to the positive voltage input terminal of detectors 70, 71 and 72 and to the negative voltage input terminal of detector 73. This integrator output $R_1$ signal is also passed through an inverter 77 to produce a signal corresponding to $-R_1$, which is applied to the negative input voltage terminals of detectors 70 and 71 and to the positive voltage input terminals of detector 73.

The output signal of detector 70, representing $x_1$, as will be later explained, is applied to a display unit 80 and to an amplifier 86. The output signal from amplifier 86 is applied to the positive input voltage terminal of phase detector 74 and, after inversion by an inverter 87, is applied to the negative input voltage terminals of detector 74. The output signal of this phase detector 74 is applied to a display unit 88.

The output signal from single-quadrant phase detector 72, representing $z_1$, is applied to one input terminal of an amplifier 82, while the output voltage produced by a manually adjustable potentiometer and voltage source 83, not illustrated in detail, representing $(b+c)$ from Equation 12, as given earlier, is applied to the other input terminal of amplifier 82. Finally, the output signal of amplifier 82, representing $z_2'$, is applied to another display unit 84.

Integrator 76 is connected, in accordance with conventional analog servoing techniques, to produce an output voltage representing $R_1$. In particular, Equation 11 may be regrouped as:

$$R_1 m_1 - R_1 m_2 - H = 0 \quad (14)$$

The particular integrator connections employed solve Equation 14, since $m_1 R_1$ is applied to one of the integrator input terminals, $-R_1 m_2$ is applied to another input terminal and, finally, $-H$ is applied to its final terminal. As will be understood, the value of the integrator output signal will be established at a value to null the applied input signal values, which, in turn, represents $R_1$.

Detector 70 solves Equation 3, representing both $x_1$ and $z_2$, since it multiplies $l_1$ and $R_1$. This output signal is applied to display 80, which, for example, may be a zero-center voltmeter, that is, one capable of reading both positive and negative applied voltages. It may be scaled in units of feed in order that the $x$ distance of the aircraft along the runway may be read directly by the pilot.

Amplifier 82 solves Equation 12, where the $-(d+c)$ term may be manually adjusted by the pilot to correspond to the particular distance between the aircraft antenna and the bottom of the aircraft wheels. Display 84, which may be similar to the voltmeter described for display 80, presents $z_2$, the height above touchdown, as its output reading.

The final display 88 presents an output reading of $y_2$ which, in turn, is formed from a solution of Equation 13, or $y_2 = x_1 m_2$, previously given. To product this reading, the $x_1$ signal of detector 70 is amplified by amplifier 86 for impedance and voltage matching purposes, and is also inverted by inverter 87 in order that both positive and negative $x_1$ signal values may be applied to the positive and negative input voltage terminals of detector 74. Since $y_2$ may take positive or negative values, display 88 is preferably similar to the previously described display 80 and may, as also described earlier, be scaled in units of feet.

The detailed electronic operation of the landing system of the present invention has been set forth and discussed in detail. Consider now, the manner by which this system may be used in practice by approaching aircraft in performing an actual landing operation. First of all, the 3-wavelength separation of horizontal array 2 yields unambiguous $m_2$ direction-cosine information within $\pm 10°$ of the runway centerline, that is, before the direction-cosine values begin to cyclically repeat. Although ambiguity characteristics of AME systems are discussed in detail in the previously referenced U.S. Patent No. 2,976,530, it may be briefly stated here, by way of review, that unique direction-cosine values are determined for all angular positions of the target craft, in both straight or inverted AME techniques, when the antennas are effectively spaced at $½λ$ or $½$ wavelengths apart, based on the carrier signal frequency. On the other hand, if a greater spacing between the antennas is employed, say $λ$, $2λ$ etc., then any specific direction-cosine value obtained would be ambiguous since the target could be located at more than one angular position relative to the antenna field and still produce the same direction-cosine output value.

In the same way, the 1.5 wavelength separation of the vertical array yields unambiguous $n_1$ elevation information within $\pm 20°$; the $½$ wavelength separations of the second and third horizontal arrays yield unambiguous $l_1$ and $m_1$ information to 180°. The $\pm 10°$ corresponding to $m_2$ and $\pm 20°$ for $n_1$ yield an unambiguous window, 10 miles "out" (in $x$) from the antennas, which is approximately 18,000 ft. high and 18,400 ft. wide. In practice, the pilot will be vectored into this landing window by other information or techniques.

So that the two separate antenna systems on each runway, as well as different runways and airports, may be distinguished from one another, different carrier frequencies are preferably transmitted by each antenna system. The pilot selects the frequency corresponding to the selected airport, runway, and direction during approach. Since H may also vary, depending on individual airport offset building and space limitations, the pilot also selects the correct H value through potentiometer 78 in FIGURE 6 to permit the receiver to compute the proper $x$, $y$, and $z$ values.

The primary purpose of the proposed system is to produce $x$, $y$, and $z$ information of sufficient accuracy to enable all-weather landing operations. A number of different landing approach and flare-out procedures may be undertaken in employing the derived information, and no attempt has been made herein to specify optimum procedures. One obvious technique, however, would have the pilot, after being vectored into the window, fly a constant-altitude path until a preselected glide slope surface is intercepted. Then, the preselected constant $n_1$ would be maintained as a glide slope angle. Flare-out could be inaugurated at some predetermined $x$ distance, with subsequent touchdown at the desired point.

The landing approach, flare-out and touchdown may be automatically provided as a continuous single mode of operation, if antenna arrays 1 and 2 are moved forward until antenna array 2 coincides with the touchdown point. Then, a constant $n_1$ elevation cosine, corresponding to the normal glide slope for the particular type of aircraft and its loading, is followed. The flight path will be hyperbolic, since the runway-centerline vertical plane intersects the surface corresponding to a constant $n_1$ in a hyperbolic function. The hyperbola associated with each $n_1$ attains zero slope at a height $n_1$ H above the touchdown point. If, now, a $Δz$ value is computed which represents the instantaneous height of the aircraft above or below the desired approach angle, and a bias value is entered into this computation to modify the $Δz$ value in accordance with $n_1$ H, automatic touchdown could be provided.

It will also be further appreciated that the operation of the groundbased systems may readily be monitored continuously at some central point to establish that all systems are operating satisfactorily. In other words, a receiver and computer system, identical to that described for use in landing aircraft, may be located in a building or tower adjacent the airport and employed to continuously compute, based on the transmitted signal frequencies, its own particular location. Since its precise location relative to the antenna system is known, any deviation of its output computed $x$, $y$, and $z$ position values away from the known values, immediately indicates a system malfunction. Such an indication may be used for initiating corrective procedures, including ground maintenance, alerting all approaching aircraft of the landing system's malfunction and ordering the employment of other landing procedures.

It will be appreciated by those skilled in the art that the specific antenna placements illustrated in FIGURE 1 represent only one such arrangement capable of providing, after appropriate computation, $x$, $y$, and $z$ information to the pilot. Stated differently, many other antenna array arrangements, each resulting in different system geometries and different computational requirements, may be employed for furnishing appropriate landing information. Then too, although the present system is illustrated for presenting computed $x$, $y$, and $z$ information to the pilot of the aircraft's actual position relative to a touchdown point, other information, for example, glide slope angle $n_1$, etc., appearing in the system, represents potentially useful landing information and may likewise be presented to the pilot. Further, if desired, some of this other information could be presented in lieu of some of the computed values as illustrated.

It will further be appreciated that each of the specific ground and airborne component sub-systems, as illustrated in block diagrammatic and detailed form, may take any one of numerous well known practical embodiments as may be found in the literature without involving invention. In addition, the computational techniques shown may well be provided by other analog techniques or by digital techniques without involving invention. Finally, it will be appreciated by those skilled in the art that the foregoing discussion relates only to a detailed embodiment whose spirit and scope is set forth in the appended claims.

What is claimed is:

1. In combination: means for generating a reference signal; means responsive to said reference signal for generating first and second signals differing in frequency and phase by an amount corresponding to said reference signal; means for modulating said reference signal on one of said first and second signals; means for radiating said first and second signals from first and second points, respectively; receiver means for receiving the radiated first and second signals; means for demodulating the reference signal from the said modulated first or second signal; and means for mixing said received first and second signals to produce a signal whose frequency corresponds to said reference signal and whose phase relationship with the demodulated reference signal corresponds to the direction cosine measured between said receiver means and a line between said first and second point.

2. In combination: first means for generating a first signal of a first frequency; second means for generating a second signal of a second frequency; means responsive to said first and said second signals for generating a third signal whose frequency and phase corresponds to the difference between said first and said second signals; means for modulating said first signal on said second signal; first and second antenna means; means for applying the modulated second signal and said third signal to said first and second antennas, respectively, whereby said modulated second and said third signals are radiated; receiver means for receiving said radiated second and third signals; means responsive to the signals received by said receiver means for demodulating the first signal from said modulated second signal for producing a reference signal whose phase corresponds to the first signal produced by said first means; and mixing means for mixing the second and third signals received by said receiver means to produce a signal whose frequency corresponds to said first signal and whose phase relative to the demodulated first signal corresponds to the direction cosine of the receiver means relative to said first and second antennas.

3. An electronic system for producing within a vehicle its slant range information relative to a fixed point, said system comprising: a first antenna array positioned a predetermined distance from said fixed point a second antenna array positioned laterally from said first array relative to said fixed point; means for generating first and second reference signals; means responsive to said first and second reference signals for producing first and second signal pairs, respectively, the signals in each of said signal pairs differing in phase and frequency from each other by an amount corresponding to its associated reference signal; means for modulating said first and second reference signals on one signal of its corresponding signal pair; means for applying said modulated first and second signal pairs to said first and second antenna arrays, respectively, whereby said modulated signal pairs are transmitted; receiving means in said vehicle for receiving the signals transmitted from said first and second antenna arrays; demodulating means for demodulating the first and second reference signals from said first and second signal pairs respectively, mixing means for mixing said first and second signal pairs, respectively, as received by said receiver means, for producing first and second data signals whose phase relationships with said first and second demodulated reference signals, respectively, represent first and second direction cosines, respectively, measured from said vehicle to said first and second antenna arrays, respectively; and computer means responsive to the predetermined distance between said antenna arrays, and the signal phase differences representing said first and second direction cosines for computing the slant range between said vehicle and said second antenna array.

4. An electronic system for producing, within a vehicle, its own $x$, $y$, and $z$ position information relative to a fixed point, said system comprising: a first antenna array positioned a predetermined distance from said fixed point; second, third, and fourth antenna arrays positioned laterally at predetermined distances from said first antenna array; means for generating first, second, third, and fourth reference signals; means for generating first, second, third, and fourth reference signals; means for generating first, second, third, and fourth pairs of signals corresponding to said first, second, third, and fourth reference signals, respectively, the frequency and phase difference between each pair of signals corresponding to the frequency and phase of its associated reference signal; modulating means for modulating each of said first, second, third, and fourth reference signals on one of its associated pair of signals; means for applying said first, second, third, and fourth modulated signal pairs to said first, second, third, and fourth antenna arrays, respectively whereby said first, second, third, and fourth modulated signal pairs are transmitted from said antenna arrays; receiver means in said vehicle for receiving the first, second, third, and fourth modulated signal pairs transmitted from the antenna arrays; means for demodulating the modulated signal in each of said first, second, third, and fourth received signal pairs for deriving first, second, third, and fourth reference signals, respectively; mixing means for mixing said first, second, third, and fourth signal pairs, respectively, received by said receiver means to produce first, second, third, and fourth data signals, respectively, whose phases relative to said first, second, third, and fourth derived reference signals, respectively, represent direction cosines of said vehicle relative to said first, second, third, and fourth antenna arrays, respectively; and computer means responsive to said first, second, third, and fourth data signals and said first, second, third, and fourth derived reference signals for computing the $x$, $y$, and $z$ position of the vehicle relative to said known point.

5. An electronic system for producing, within a vehicle, its own $x$, $y$, and $z$ position information relative to a fixed point, said system comprising: a horizontal first antenna array positioned a predetermined distance H from said fixed point; an offset antenna system positioned laterally at a predetermined distance from said first antenna array, said offset antenna system including a horizontal second antenna array lying parallel to said first horizontal antenna array, a horizontal third antenna array lying perpendicularly to said second horizontal antenna array, and a vertical fourth antenna array; means for generating first, second, third, and fourth reference signals; means for generating first, second, third, and fourth pairs of signals corresponding to said first, second, third, and fourth reference signals, respectively, the frequnecy and phase difference between each pair of signals corresponding to the frequency and phase of its associated reference signal; modulating means for modulating each of said first, second, third, and fourth reference signals on one of its associated pair of signals; means for applying said first, second, third, and fourth modulated signal pairs to said first, second, third, and fourth antenna arrays, respectively, whereby said first, second, third, and fourth modulated signal pairs are transmitted from the antenna arrays; receiver means in said vehicle for receiving the first, second, third, and fourth modulated signal pairs transmitted from said antenna arrays; means for demodulating the modulated signal from each of said first, second, third, and fourth received signal pairs for producing said first, second, third, and fourth derived reference signals, respectively; signal mixing means for mixing said first, second, third, and fourth signal pairs, respectively, received by said receiver means to produce first, second, third, and fourth data signals, respectively, whose phases relative to said first, second, third, and fourth derived reference signals represent $m_2$, $m_1$, $l_1$, and $n_1$ direct cosines of said vehicle position measured relative to said first, second, third, and fourth antenna arrays, respectively; and computer means responsive to the values of H, $m_2$, $m_1$, $l_1$, and $n_1$ for computing the $x$, $y$, and $z$ position of the vehicle relative to said known point.

6. The electronic system according to claim 5 wherein said computer means includes first means responsive to $m_1$, $m_2$, and H for computing the slant range, $R_1$, from said antenna system to said vehicle, second means responsive to said computed value $R_1$ and $l_1$ for computing the distance, $x_1$, of the vehicle from said antenna system measured perpendicularly from said first antenna array; third means responsive to said computed value $R_1$ and $n_1$ for computing the height, $z_1$, above said offset antenna system, and fourth means responsive to the computed value $x_1$ and $m_2$ for computing $y_2$, the lateral distance from the line perpendicular to said first antenna array.

7. The electronic system according to claim 6 wherein said first means includes integrator means producing output signals representing $R_1$ and $-R_1$, first and second analog multiplier means, means for applying the $R_1$ and $m_1$ signals to said first analog multiplier means, means for applying the $-R_1$ and $m_2$ signals to said second analog multiplier means, means for applying the output signals of said first and second analog multiplier means to said integrator, and means for applying a signal representing H to said integrator means for forming a closed loop computational servo system in which the output signal $R_1$ of the integrator satisfies the equation $$R_1 = \frac{H}{m_1 - m_2}$$

8. The electronic system according to claim 7 in which said second computing means includes third analog multiplier means, means for applying said $l_1$ and $R_1$ signals to said third analog multiplier means for producing the product $R_1 l_1$ representing said $x_1$ value, said third computing means including fourth analog multiplier means, means for applying the $R_1$ and $n_1$ signals to said fourth analog multiplier means for producing the product $R_1 n_1$ representing said $z_1$ value, and said fourth computing means includes fifth analog multiplier means, and means for applying the $m_2$ and said computed $x_1$ signal from said third analog multiplier means to said fifth analog multiplier means for producing the product $x_1 m_2$ representing said $y_2$ value.

9. The electronic system according to claim 8 wherein said first, second, third, fourth, and fifth analog multipliers include single-quadrant, four-quadrant, four-quadrant, single-quadrant and four-quadrant linear phase detectors, respectively.

10. The electronic system according to claim 8 including, in addition, first, second, and third indicating means, each of said indicating means being responsive to the value of an applied signal for producing an indication corresponding thereto, means for coupling said first, second, and third indicating means to said third, fourth, and fifth analog multiplier means, respectively, whereby said $x_1$, $z_1$, and $y_2$ values, respectively, are indicated.

11. An aircraft landing system for producing information within an approaching aircraft of its position relative to a touchdown point on the runway of an airfield, said system comprising: a plurality of ground based means positioned in accordance with a predetermined pattern relative to said touchdown point for radiating a plurality of signal pairs, respectively; and electronic means in an approaching aircraft for determining the aircraft position relative to said touchdown point, said electronic means including means for receiving said plurality of said signal pairs, means responsive to the received plurality of signal pairs for combining each signal pair to produce a plurality of signals, respectively, representing a plurality of direction cosines to said plurality of ground based means, respectively, computer means responsive to the plurality of signals produced by the last-named means and the predetermined pattern of said plurality of ground based means for determining the left or right distance, the forward or backward distance, and the height of the aircraft from said touchdown point, and means for indicating the information determined by said computer means.

References Cited in the file of this patent
UNITED STATES PATENTS
2,417,807  Brunner _____ Mar. 25, 1947